(12) United States Patent
Fargeix et al.

(10) Patent No.: US 7,957,244 B2
(45) Date of Patent: Jun. 7, 2011

(54) METHOD OF READING OPTICAL INFORMATION IN SUPER-RESOLUTION

(75) Inventors: Alain Fargeix, Meylan (FR); Olivier Lemonnier, La Terrasse (FR); Ludovic Poupinet, Sassenage (FR)

(73) Assignee: Commissariat a l'Energie Atomique (FR)

( * ) Notice: Subject to any disclaimer, the term of this patent is extended or adjusted under 35 U.S.C. 154(b) by 476 days.

(21) Appl. No.: 12/109,977

(22) Filed: Apr. 25, 2008

(65) Prior Publication Data

US 2008/0267037 A1 Oct. 30, 2008

(30) Foreign Application Priority Data

Apr. 27, 2007 (FR) ...................................... 07 03098

(51) Int. Cl.
*G11B 5/09* (2006.01)
(52) U.S. Cl. ............... 369/59.21; 369/272.1; 369/275.1; 369/275.2; 369/124.11; 369/124.15; 369/100
(58) Field of Classification Search .................. None
See application file for complete search history.

(56) References Cited

U.S. PATENT DOCUMENTS

| | | | |
|---|---|---|---|
| 5,153,873 A | 10/1992 | Spruit et al. | |
| 5,381,391 A | 1/1995 | Yanagisawa et al. | |
| 5,569,517 A | 10/1996 | Tominaga et al. | |
| 5,812,515 A | 9/1998 | Matsui | |
| 2001/0033517 A1 | 10/2001 | Ando et al. | |
| 2001/0046100 A1* | 11/2001 | Taguchi | 360/59 |
| 2002/0071194 A1* | 6/2002 | Honma | 360/51 |
| 2006/0072434 A1 | 4/2006 | Shintani et al. | |
| 2007/0223613 A1* | 9/2007 | Verschuren et al. | 375/265 |
| 2007/0237059 A1* | 10/2007 | Kasahara | 369/124.1 |
| 2007/0274185 A1* | 11/2007 | Kikukawa et al. | 369/59.1 |

OTHER PUBLICATIONS

Seong-Keun Ahn et al.; "A Nonlinearity Compensated Channel Model and Partial Response Maximum Likelihood (PRML) Simulator for the High Density Optical Disc"; Jpn. J. Appl. Phys., vol. 39, No. 2B, Feb. 28, 2000, pp. 824-829, XP002457976.

* cited by examiner

*Primary Examiner* — Joseph Haley
*Assistant Examiner* — Ifedayo Iluyomade
(74) *Attorney, Agent, or Firm* — Lowe Hauptman Ham & Berner, LLP (57) ABSTRACT

The invention relates to the reading of digital optical recordings at very high density (CD, DVD, etc.). Reading is done by a PRML ("Partial Response Maximum Likelihood") technique which uses a model of analog response to the recording of an isolated information bit. Customarily, the response model is represented by four or five signal samples having standardized levels 1 or 2. To take account of particular phenomena of super-resolution reading, the invention proposes the use of a model having 6 to 10 samples that can take 4 or 5 standardized levels. This model can result from the superposition of two simpler models having only two possible levels of samples taken from 1, 2 and 3.

17 Claims, 5 Drawing Sheets

METHOD OF READING OPTICAL INFORMATION IN SUPER-RESOLUTION

RELATED APPLICATIONS

The present application is based on, and claims priority from, French Application Number 07 03098, filed Apr. 27, 2007, the disclosure of which is hereby incorporated by reference herein in its entirety.

FIELD OF THE INVENTION

The invention relates to the reading of digital optical recordings at very high density (CD, DVD, etc.).

BACKGROUND OF THE INVENTION

When seeking to increase the density of information recorded on an optical disk, one is generally limited by the performance of the information reading device. The basic principle is that only with very great difficulty can physical information registered in the disk be read if its dimension is lower than the limit of resolution of the optical system which will serve for reading this information. Typically, with reading by a red laser of wavelength 650 nm and a numerical aperture of 0.6, it is not normally possible to expect to correctly read information of dimension lower than 0.4 micrometers, strictly 0.3 micrometers.

However, so-called super-resolution procedures have been devised for reading information whose physical dimension is lower, indeed even much lower, than the wavelength. These procedures are based on the non-linear optical properties of certain materials. The expression non-linear properties is understood to mean the fact that certain optical properties of the material change as a function of the intensity of the light that they receive. The reading laser itself will locally modify the optical properties of the material in a reversible manner through its thermal, optical, thermo-optical and/or optoelectronic effects on smaller dimensions than the dimension of the laser reading spot; on account of the change of property, an item of optical information present in this very small volume becomes detectable although it would not have been detectable without this change.

The phenomenon utilized is based mainly on two properties of the reading laser that will be used:
- on the one hand the laser is very strongly focused in such a way as to exhibit an extremely small cross section (of the order of the wavelength) but whose power distribution is Gaussian, very strong at its center, very attenuated at the periphery,
- and on the other hand, a reading laser power is chosen such that the power density over a small part of the cross section, at the center of the beam, significantly modifies an optical property of the layer, whereas the power density outside of this small portion of cross section does not significantly modify this optical property; the optical property is modified in a direction tending to allow the reading of an item of information which would not be readable without this modification.

For example, the optical property which changes is an increase in the optical transmission in the case where the reading of a bit consisting of a physical mark formed on the optical disk requires transmission of the laser beam up to this physical mark. The nonlinear layer is then interposed in the path of the beam to the physical mark. The center of the laser beam will be able to cross the layer up to the mark, on account of the fact that on crossing the layer the intensity of the incident light renders it more transparent, whereas the periphery of the beam will not cross since it does not sufficiently modify the optical indices of the layer to render it more transparent. Everything then occurs as if a beam had been used that was focused on a much narrower diameter than permitted by its wavelength.

Various theoretical proposals have been formulated for implementing these principles, but none has given rise to industrial development. U.S. Pat. No. 5,153,873 recalls the theory. U.S. Pat. No. 5,381,391 gives the example of a film having non-linear reflectivity properties. U.S. Pat. No. 5,569,517 proposes various materials having crystalline phase change.

Additionally, it is known that the reading of very dense digital information (marks very close together in the direction of travel of the marks under the laser beam or very short marks in this direction) is difficult to achieve without error by simple detection of an electrical voltage threshold being overshot by the signal arising from the reading.

Specifically, even assuming that it is possible to record marks of properly square shape defining 0 or 1 binary information (for example 0 in the absence of a hole in a physical layer, 1 in the presence of a hole), the reading signal which results from these marks traveling past is not a square signal but a deformed signal on account of the limited bandwidth of the reading system. And in any event, it is not known how to record perfectly square marks on account of the physical procedures employed for recording these marks.

The combination of this imperfection of the physical marks and of the imperfection of the reading systems gives rise to a voltage signal of very degraded form for representing an item of information which ought to be very square (purely binary information). And this voltage signal of very degraded form is all the more deformed and difficult to interpret the closer together the marks; for example, instead of having very marked voltage spikes, well localized in time at each binary transition, and easy to detect by a voltage threshold detector, it is appreciated that the reading signal comprises hollows or bumps that are less marked at the locations of these binary transitions; the amplitude of these hollows or these bumps and their temporal localization are moreover very dependant on the succession of marks which precedes the mark that one wishes to detect.

In the prior art, more sophisticated procedures for the electronic processing of the reading signal have been proposed; these procedures allow better decoding, for a given information density, of the binary information on the basis of a very deformed reading signal, or alternatively they make it possible to record and read out information at a higher density than that permitted by the procedures with simple threshold detection. These more sophisticated procedures are called PRML procedures, the abbreviation standing for "Partial Response Maximum Likelihood". They rely on:
- the theoretical estimation of the forms of response that may be taken by the signal at the output of the processing channel when this channel receives various models of successions of binary information (Partial Response PR),
- and on the comparison between the output signal actually detected and the various theoretical forms of response so as to determine which succession of binary information is the one that was most probably emitted at the input to the channel to give this signal on output (Maximum Likelihood ML).

When one speaks of a channel for processing binary information, this implies all of the electronic and physical or chemical processing going from the writing of the binary information to the disk to the reading of this information in the form of an analog electrical signal. Indeed, it is upstream of the writing that a binary item of information to be recorded is available, but the writing itself degrades the binary nature of the information (the physical marks recorded have shapes that are not rectangular) and the reading also degrades, and generally even more, this nature.

In the reading systems envisaged for reading optical disks, whether it be with a red laser or with a blue laser (the blue laser allowing reading of information of higher resolution), it has been proposed to use PRML procedures in which the response waveform of an isolated information bit (in practice an isolated binary transition) is regarded as a Gaussian shape centered on a characteristic instant defining the temporal position of the bit. This Gaussian shape is thereafter modeled by a succession of P samples of nonzero values taken from N possible values. The numbers P and N are small (a few units) so that the PRML calculations are reasonable in terms of quantity; an approximation by a larger number of values N is more exact but requires more calculations; an approximation with a larger number of samples P would be better but necessitates a larger sampling frequency and hence faster calculations. Given that the numbers N and P are small, the model obtained is very Spartan and the term "caricature" will sometimes be used to denote this model of a binary response or the model of a response to a succession of bits, and the verb "to caricature" will be used to denote the calculation of a theoretical model of an information bit or of a succession of information bits.

Figure 1:
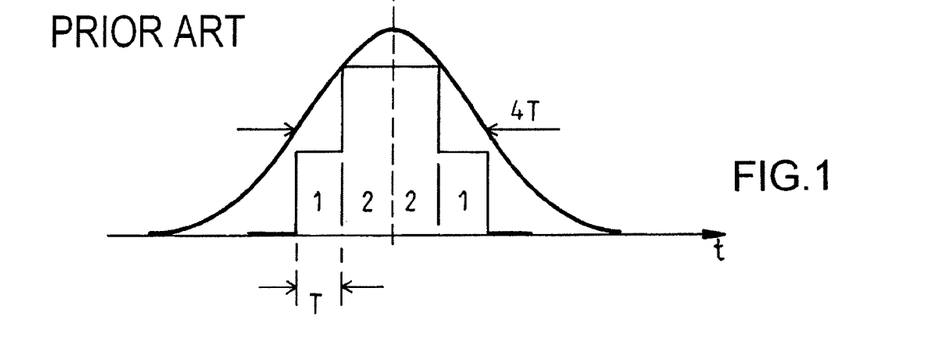
FIG. 1, already described, represents a typical exemplary form of standard Gaussian response for an isolated binary transition, as well as the caricatural model using P=4 nonzero samples and N=2 coding levels 1 and 2.

FIG. 1 represents a typical example of a Gaussian theoretical shape of response for an isolated binary transition, as well as the caricatural model using P=4 nonzero samples that can take only N=2 standardized values 1 and 2. These values P=4 and N=2 are conventionally used, the Gaussian being caricatured by the succession of four successive nonzero digital values, namely 1,2,2,1. The sampling frequency is F, and the sampling period is T=1/Fe (one sample at each period T). For appropriate reading of the binary information using a PRML procedure with this type of form of theoretical Gaussian analog response for an isolated binary transition and this type of digital modeling of the response, provision may be made for the sampling period to be equal to a quarter of the mid-height width of the Gaussian curve. This is what is represented in FIG. 1. And it is then appreciated that it is possible to recover a binary information item recorded on the disk on condition that the successive binary transitions are spaced apart by at least twice the sampling period (2T). Below this value, the transitions would be too close together to be able to be read with sufficient safety.

Figure 2:
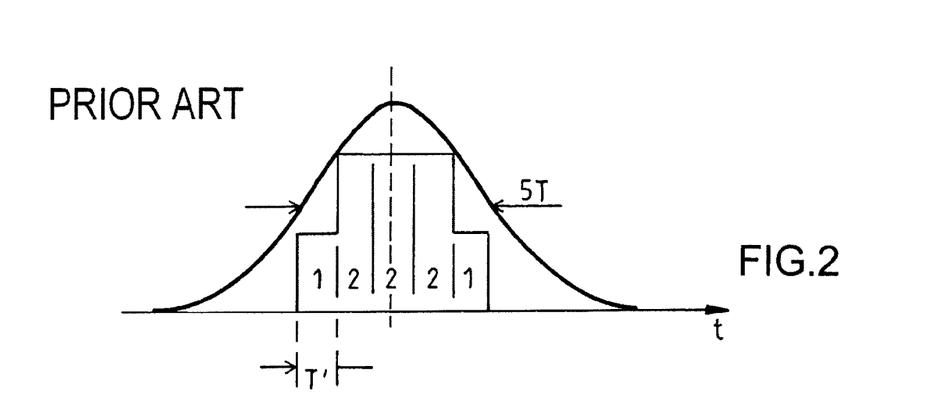
FIG. 2, already described, represents another exemplary modeling of the same form of analog response, but this time by P=5 nonzero samples and N=2 coding levels.

Another example of Gaussian waveform caricature is represented in FIG. 2 with P=5 and N=2. The model or caricature is now 1,2,2,2,1. It gives slightly better results than the 1,2,2,1 model and is proposed, like the previous one, in the BD (Bluray Disk) and HD_DVD ROM standards.

Figure 3:
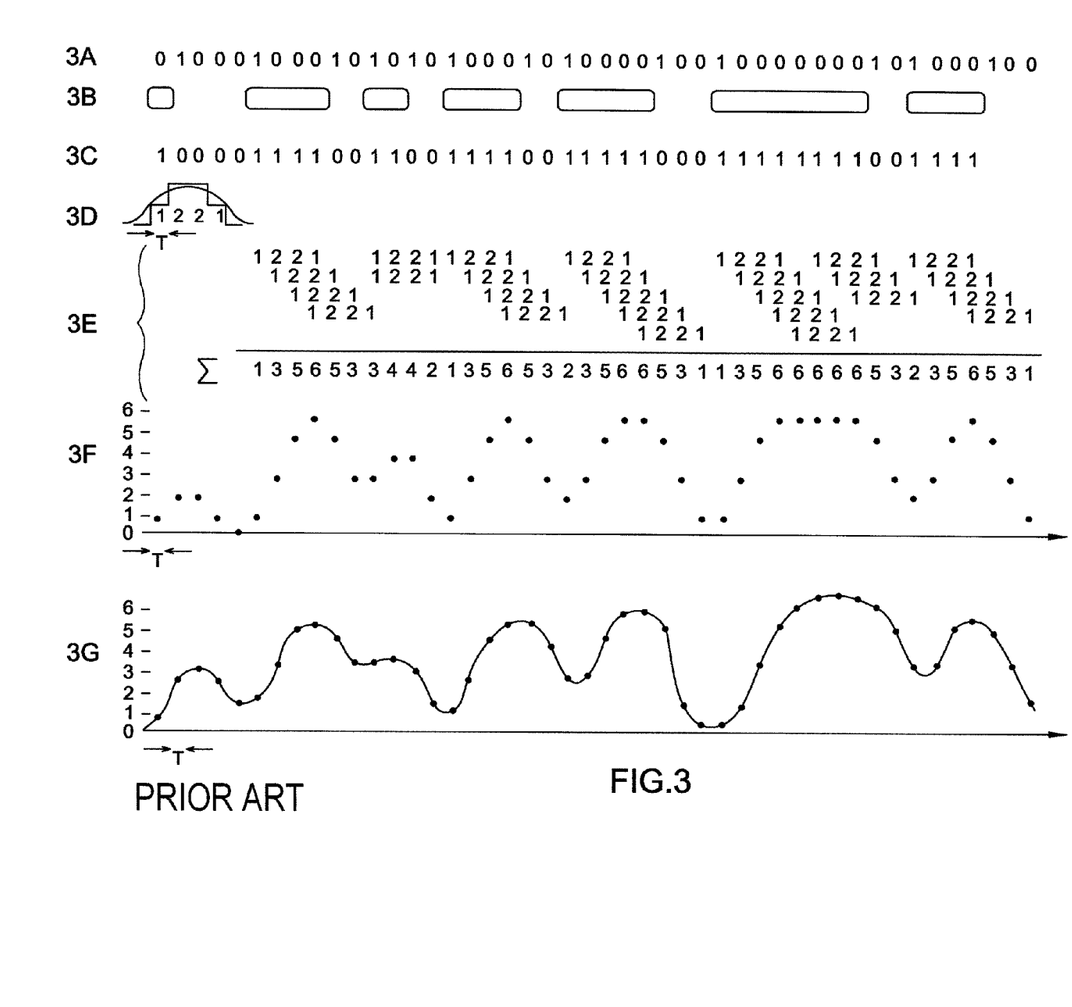
FIG. 3, already described, represents the principle of a reading procedure based on PRML processing.

FIG. 3 (3A to 3F) recalls the principle of a PRML procedure.

Represented in line 3A is a binary information sequence to be written, coded by a variable number of bits which preserve one and the same value between two binary transitions (RLL code). The duration of a bit when reading back the recorded information is assumed to be equal to the sampling period T used in the PRML procedure, but the binary sequence is conventionally such that there are always at least two identical consecutive bits.

Represented in line 3B is the succession of physical marks recorded on the basis of this sequence: marks of length corresponding to the number of bits between two transitions, followed by an interval between marks, the interval having a length corresponding to the number of bits before the next transition. The lengths of marks, like the distances between marks, then represent, under a code other than the starting RLL code, the binary information stored. The length of a mark may be expressed as a duration, and more precisely as an integer number of periods T, the marks traveling past at constant speed under the reading laser beam, the value T representing the duration of a bit.

Represented in line 3C is the coded digital information corresponding to the physical marks: a mark present is a 1, an absence of mark (or intermark or mark of inverse polarity) is a zero.

Represented in line 3D is the conventional response model for an isolated one 1 bit; the example chosen is that of the 1,2,2,1 model of FIG. 1; the response for a zero bit (absence of mark) is assumed to be zero.

Represented in the group of lines that is denoted 3E is the succession of successive digital models 1,2,2,1 that will engender the presence of each of the bits of each of the successive marks while the length of the model (4T) is greater than the length of a bit (T): the models overlap and the model resulting from a succession of 1 bits is the addition of the digital values shifted in time resulting from these multiple overlaps. The result of this digital addition is registered on the last line of group 3E.

Represented in line 3F is the temporal succession of the digital values resulting from this overlap and from this addition. The digital values extend over a scale ranging from 0 to 6. The number 6 being the ceiling which results from the overlap for the values P=4 and N=2. The scale would go from 0 to 8 for P=5 and N=2.

Represented in line 3G is an actual reading signal which corresponds to the reading of the marks which were recorded on the basis of the binary sequence of line 3A, as well as the digital values resulting from a sampling of this signal at the frequency Fe=1/T where T is the theoretical duration of a bit, having regard to the length of a physical mark corresponding to a bit and the speed of rotation of the disk under the reading laser beam. The reading signal is standardized with a scale (0 to 6) similar to that of the theoretical model of FIG. 3F so that comparison is possible.

The PRML technique consists in gathering a succession of K samples of the analog signal resulting from an actual reading; in calculating all kinds of predetermined theoretical successions of the type of that of line 3A (hence for all kinds of possible binary successions which could have been recorded although it is not known which one was really recorded); in measuring the resemblance between the succession received and each of the successions calculated, and in deducing therefrom which binary sequence was probably the starting one given the better resemblance found.

The resemblance is calculated preferably by the so-called least squares procedure in which:
  for a determined succession of samples, the sum is calculated of the squares of the differences between each sample of the succession received and the corresponding sample of the succession calculated,
  this is repeated for all the possible successions calculated,
  the various sums of squares calculated are compared,
  and the binary succession which gives the smallest sum of squares is selected from among all the possible binary successions; it is considered that this binary succession is indeed the sequence which was recorded in the disk, because the theoretical response calculated for this succession is that which most resembles the reading signal on the basis of the least squares criterion.

SUMMARY OF THE INVENTION

According to the invention, it has been found that the usual caricatures (1,2,2,1 or 1,2,2,2,1) of forms of partial response PR were not optimal for allowing correct decoding of the signals read when the physical marks are very small marks intended to be read in super-resolution, that is to say marks that can be read by a reading laser beam whose central part only is powerful enough to modify the optical properties of the marks without the periphery of the beam being powerful enough to permit this modification.

The invention relies on the intuition that in the case of super-resolution, it is not sufficient to increase the sampling frequency Fe and hence to reduce the time T to take account of the smallest size of the marks and of a greater narrowness of the truly useful beam. Indeed, although the truly active part of the laser beam in super-resolution is much narrower, nonetheless the beam does indeed exist even outside its central part, and it then extends over a larger number of marks even if it does not have the same optical activity at its periphery and in its center.

It is proposed that the number P of nonzero samples defining the caricatured model and/or the number N representing the number of possible nonzero discrete levels in the response model be modified by significantly enhancing the height of the central part of the model, without however going as far as a number P or a number N which would render the likelihood calculations too unwieldy to permit real-time reading. According to the invention, it is proposed that the response model of an isolated bit be caricatured by superposing a first simple model caricaturing a Gaussian representative of the spatial energy distribution of a reading laser beam and of a second simple model caricaturing a narrower Gaussian than the first and representative of an additional optical action limited to the central part of the laser beam.

Thus, the invention relates to a method of reading digital information registered in layers of an optical information storage medium that can be read in super-resolution on the basis of an optoelectronic system comprising a reading laser beam, the power density of which at its center is sufficient to produce a local modification of the optical properties of at least one of the layers over a smaller zone than the resolution of the optoelectronic system, the method comprising the modeling of the response provided by varied binary sequences on the basis of the modeling of the partial response provided by an isolated information bit, and the searching for the maximum resemblance between a sequence of samples arising from the reading of the information and the responses of the varied sequences modeled, this method being characterized in that the model corresponding to an isolated bit, on the basis of which the models for the varied binary sequences are established, consists of the superposition of a first simple model representing a Gaussian representative of the spatial energy distribution of a reading laser beam and of a second simple model representative of a narrower Gaussian than the first and representative of an additional optical action limited to the central part of the laser beam.

To achieve this efficiently, it has been found that it was necessary preferably to construct the caricatured model of an isolated bit with the aid of P samples of nonzero values where the nonzero values are taken among N possible values, the number P being at least 6 (preferably between 7 and 10) and the number N lying between 3 and 5.

Consequently, in other words, the invention relates to a method of reading digital information registered in layers of an optical information storage medium that can be read in super-resolution on the basis of an optoelectronic system comprising a reading laser beam, the power density of which at its center is sufficient to produce a local modification of the optical properties of at least one of the layers over a smaller zone than the resolution of the optoelectronic system, the method comprising the modeling of the response provided by varied binary sequences on the basis of the modeling of the partial response provided by an isolated information bit, and the searching for the maximum resemblance between a sequence of samples arising from the reading of the information and the responses of the varied sequences modeled, this method being characterized in that the model corresponding to an isolated bit, on the basis of which the models for the varied binary sequences are established, consists of P samples of nonzero values where the nonzero values are taken among N possible values, the number P being at least 6 (preferably between 7 and 10), the number N lying between 3 and 5. It is preferable according to the invention that the model consist of the additive superposition of two simple models (caricatures of Gaussians of two different widths) each having two possible nonzero levels, one having a smaller (preferably around half) number $P_2$ of samples (for example 3 or 4) than the number $P_1$ of samples (for example 7 or 8) of the other. The samples of the second model are taken at the same instants as samples of the first model (in principle from among the sampling instants closest to the center of the first model). These choices result in a model with a more marked central spike than in the case of the models of simple Gaussians of the prior art, this spike representing the effect of super-resolution at the center of the laser beam.

Preferably, the first model comprises $P_1$=7 or 8 nonzero samples with $N_1$=2 nominal values which are the values 1 and 2 and the second model comprises $P_2$=3 or 4 nonzero samples with $N_2$=2 nominal values taken among the values 1, 2 and 3. In practice, the complete model preferably comprises 7 or 8 samples of nominal values that can range either from 1 to 4, or from 1 to 5.

The models with 10 samples 1,1,2,3,4,4,3,2,1,1 or 1,1,2,3, 5,5,3,2,1,1 are the preferred models in the case of a model having a number of even samples. The model 1,1,2,3,4,3,2, 1,1 with nine samples is the preferred model in the case of an odd number of samples.

These models, which are not caricatures of simple Gaussian curves, account better for the behavior of the information processing channel in the case of a recording intended to be read in super-resolution.

The caricatured model for an isolated bit may also be asymmetric, consisting of the superposition of two symmetric simple models one of which is shifted forwards or backwards (by one or two sampling periods) with respect to the center of temporal symmetry of the other.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

Figure 4:
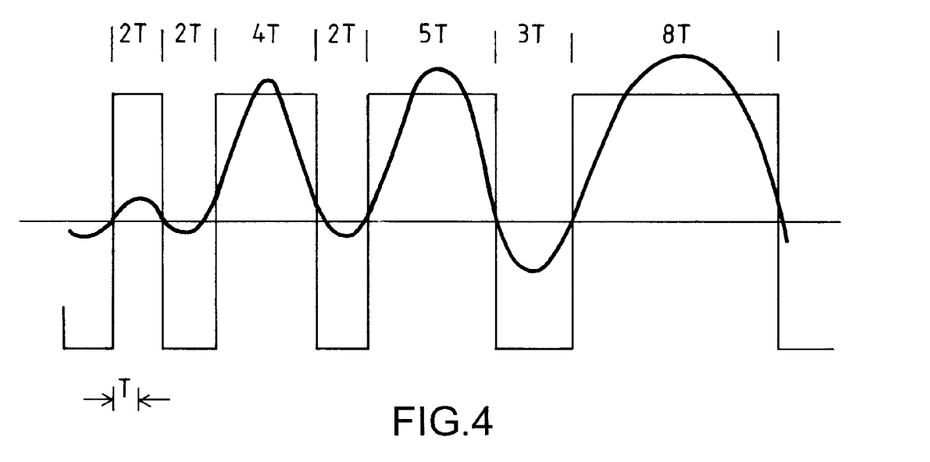
FIG. 4 represents a particular binary sequence of information registered in a disk and a form of typical analog signal which could arise from an optical reading head reproducing this binary sequence in the case of a conventional reading.

Represented in FIG. 4 is an exemplary binary sequence recorded in the form of physical marks whose length corresponds to a number of successive bits at the same high level, and of distances between marks whose length corresponds to a number of successive bits at the zero level. This sequence will be denoted 2,2,2,4,2,5,3,8, this notation signifying that the sequence comprises successively 2 bits at the low level, 2 bits of high level, 2 bits of low level, 4 high bits, 2 low bits, 5 high bits, 3 low bits, 8 high bits.

The duration of a bit is equal to a duration T of sampling of the reading signals used in the PRML procedure.

The analog curve drawn in the same figure represents by way of illustration a convolution of this binary sequence with the response (modeled in analog) of the recording channel and reading of the stored information; the modeling takes account of all the bandwidth imperfections of the reading head, but it also takes account of the fact that the edges of the physical marks are not sharp edges; for simplicity, we shall speak of modeling of the reading head, whereas in reality the modeling is that of the response of the whole information channel going from the binary information to be recorded to the analog reading signal which will serve to restore the binary information.

The analog curve representing the convolution of the binary information with the response of the reading head has been represented in phase with the binary information signal so as to better elucidate the relation between them. This analog curve represents as it were the typical analog reading signal (with no super-resolution effect) which could arise from an actual reading head under which the binary sequence travels.

Figure 5:
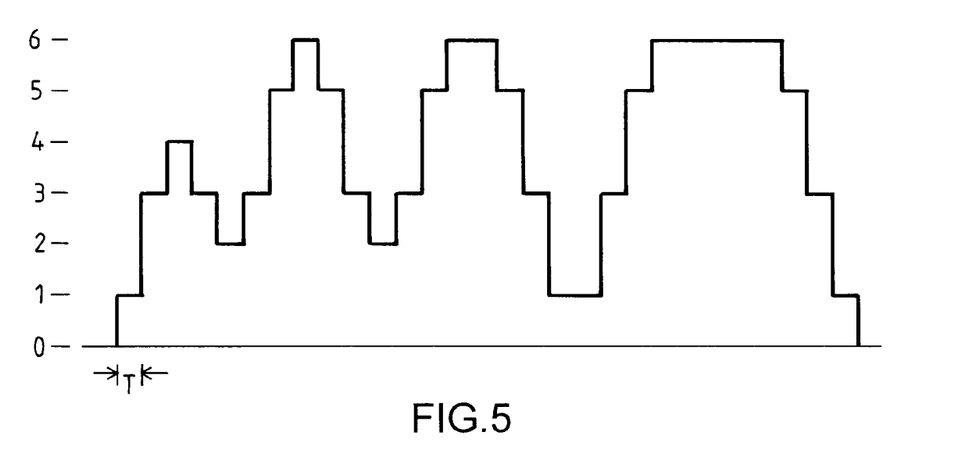
FIG. 5 represents a digital signal caricaturing the binary sequence of FIG. 4 when the model of FIG. 1 is used.

FIG. 5 represents symbolically a staircase curve which results from the digital modeling of the response of the reading head to the same binary sequence, using the 1,2,2,1 model of duration 4T of FIG. 1 as basic digital model for an isolated information bit. The staircase curve which is represented is a simplified curve so as to retain adequate readability of the diagram. The actual curve calculated would be different from the one represented.

There is a resemblance between the staircase curve of FIG. 5 and the analog curve of FIG. 4 if the 1,2,2,1 model has a certain resemblance with the actual response of the reading head to an isolated information bit, and it is understood that the model of FIG. 5 may serve in a PRML procedure for decoding a reading signal which has the analog shape represented in FIG. 4.

However, if one wished to retain the same model to detect binary sequences constructed on the basis of shorter marks, for example lengths equal to a bit (duration T), assuming that the super-resolution provides an analog signal representative of these short marks, this model would no longer be effective.

Figure 6:
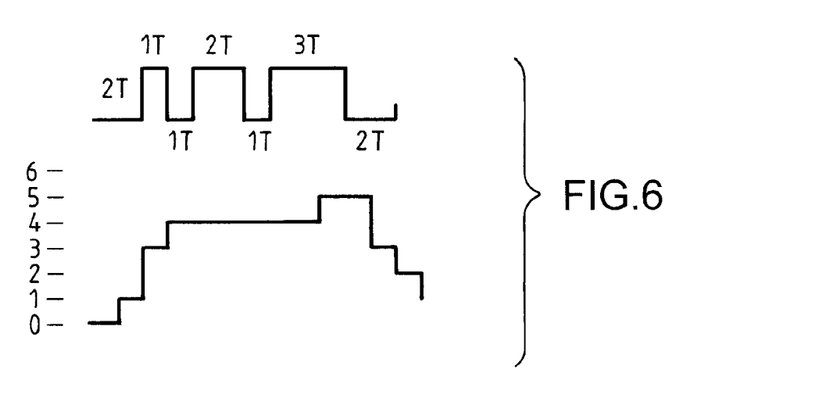
FIG. 6 represents a signal caricaturing a binary sequence with marks and spacings that are much shorter.

FIG. 6 represents by way of example the caricatural model of a binary sequence 2T, 1T, 2T, 1T, 3T, 2T. The caricature obtained, still with the 1,2,2,1 model of FIG. 1, no longer even exhibits hollows and bumps which would have a few resemblances with an analog signal obtained in super-resolution.

Figure 7:
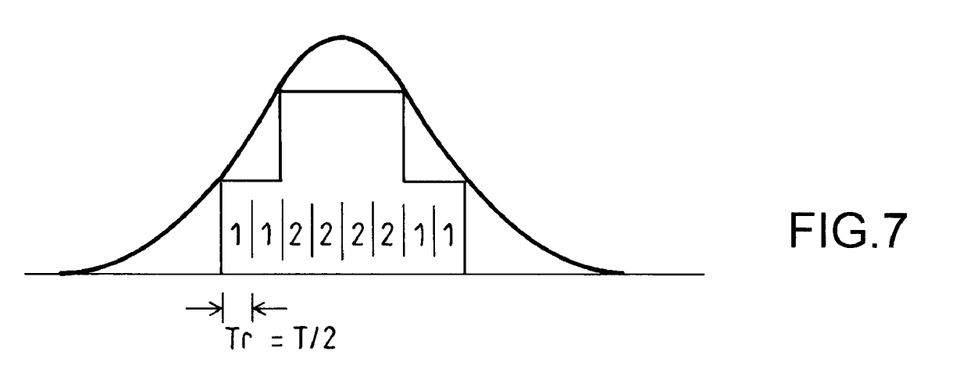
FIG. 7 represents a model much like that of FIG. 1 with half the sampling period and twice the number of samples.

FIG. 7 represents a model very much like that of FIG. 1. This model is different in that the sampling frequency has simply been doubled while keeping, however, the same overall duration for the representation of the response to an isolated bit since neither the size of the laser focusing spot nor the length of a bit (duration T) has been changed. The two levels of value 1 and 2 are kept. The model therefore extends over N=8 nonzero values instead of 4. The model is 1,1,2,2, 2,2,1,1. The sampling period is Tr=T/2 if T was the sampling period in the case of FIG. 5.

If a calculation of a model of a binary sequence corresponding to the same actual lengths of marks as in FIG. 5, that is to say a signal corresponding to a binary sequence which is no longer 2,2,2,4,2,5,3,8, but which becomes 4,4,4,8,4,10,6, 16 since a minimum length of marks of duration 2T now corresponds to four bits of duration Tr=T/2, is performed with this isolated bit model, a better caricature quality than that of FIG. 5 (finer) will be obtained but nothing much else other than far more unwieldy calculations.

However, if one then seeks to carry out a reading of marks in super-resolution, that is to say for example marks of half the length, i.e. a duration of 2 bits rather than 4, the binary sequence again becomes 2,2,2,4,2,5,3,8 with the reduced period Tr=T/2 if the 1,1,2,2,2,2,1,1 model of FIG. 7 is used. In this case, it is found that the calculated model would not always make it possible to distinguish marks that are close together and short, of 2 bits duration, whereas measurements performed in super-resolution seem to show that marks of very small size give rise to an analog signal making it possible to distinguish the presence of very short marks such as these.

The same findings may be made on the basis of the 1,2,2, 2,1 model of FIG. 2. It makes it possible to correctly caricature a sequence 2,2,2,4,2,5,3,8 with a period T' (equal to around 4/5 of T) where the length and the minimum spacing of the marks is 2T'. However, it does not make it possible to caricature the signal arising from the reading in super-resolution of marks of much shorter duration and spacing such as T'. The choice of a model deduced from the model of FIG. 2 but doubled up as 1,1,2,2,2,2,2,2,1,1 with a sampling duration Tr'=T'/2 slightly improves the reading of marks of duration 2T', as did the model of FIG. 7, but it is found that it does not always make it possible to correctly caricature the reading in super-resolution of marks of duration or spacing T'.

Figure 8:
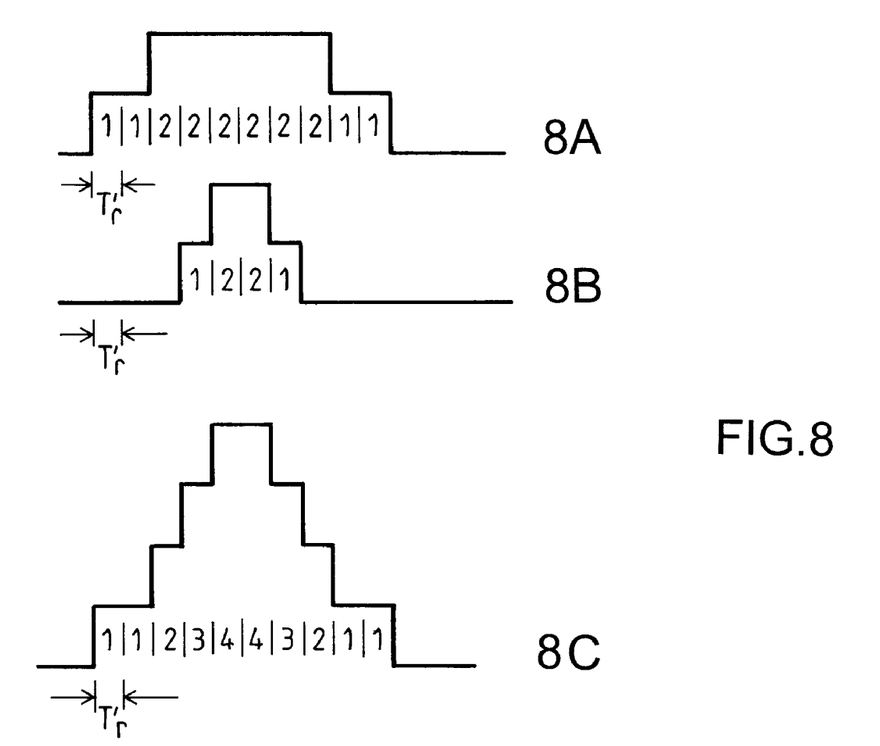
FIG. 8 represents a caricature model for an isolated bit according to the present invention.

FIG. 8 represents an isolated bit caricatural model proposed by the present invention. This model results from the superposition of a first model (line 8A) with $P_1$=10 samples of $N_1$=2 to two values, namely 1 and 2, and of a second model (line 8B), centered on the first, with $P_2$=4 samples of $N_2$=2 values 1 and 2. The first model is the 1,1,2,2,2,2,2,2,1,1 model. The second model is the 1,2,2,1 model. The model resulting from the addition of the first two is the 1,1,2,3,4,4, 3,2,1,1 model (line 8C), with P=10 samples and N=4 values 1,2,3,4. The sampling period is denoted T'r, in principle slightly smaller than Tr.

It has been found that this model was better able to account for reading in super-resolution because it takes account both of a width of laser focusing spot which covers a width equivalent to about 10 information bits and a feedback signal sensitivity which is greater at the center of the focusing spot because of the super-resolution.

More generally, other similar models which have the same advantages can be constructed by superposing a wide Gaussian model (at least 6 nonzero samples) having two levels and a narrower Gaussian model (not more than 4 nonzero samples) also having two levels. The resulting model has at least 6 samples and a maximum of 4 or 5 levels).

Figure 9:
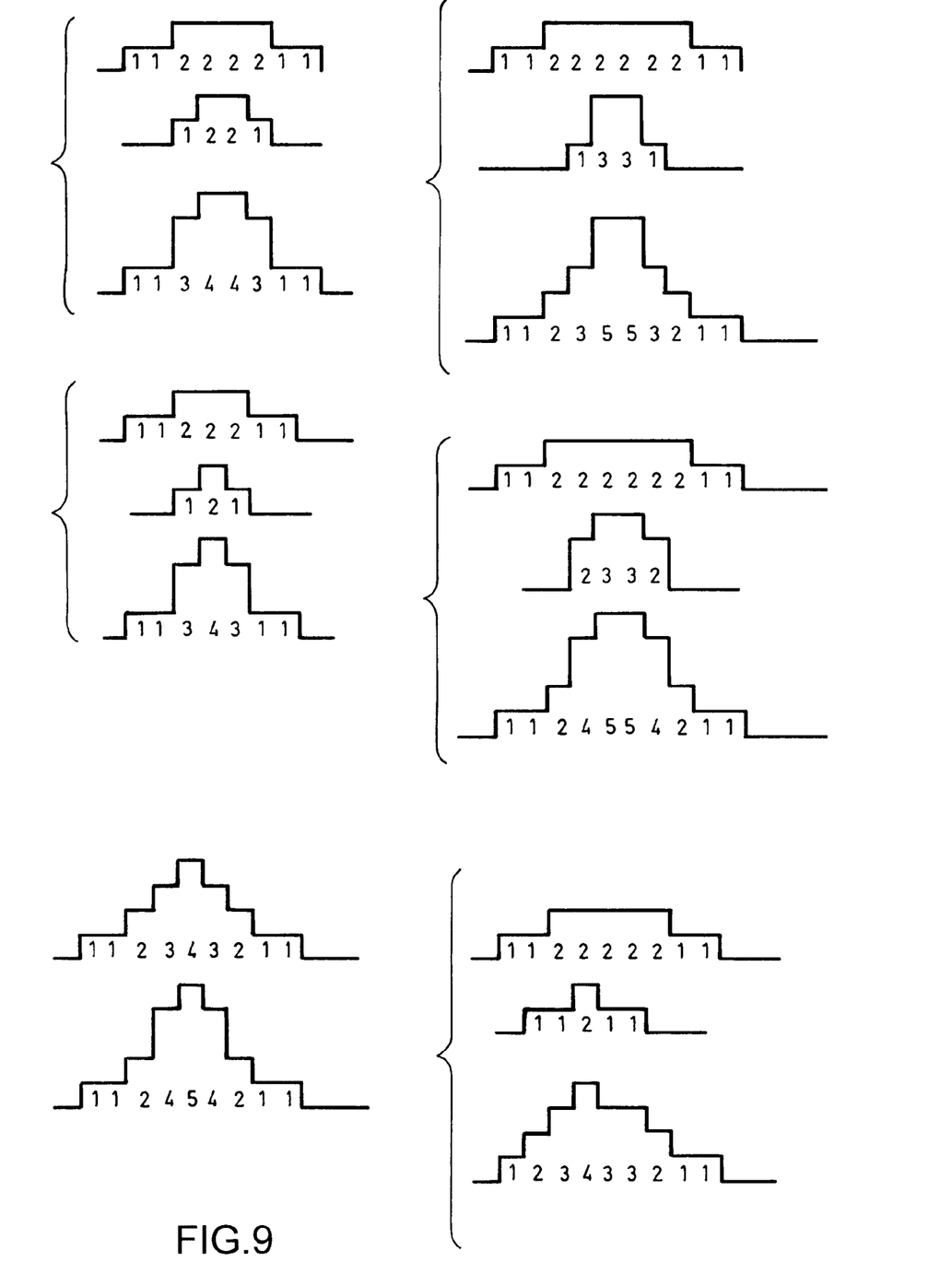
FIG. 9 represents various other possible models.

FIG. 9 represents possible caricature models of isolated bits according to the invention.

Structures with an even number of samples:

1,1,3,4,4,3,1,1 superposition of a wide simple Gaussian 1,1, 2,2,2,2,1,1 model and of the narrow Gaussian 1,2,2,1 model 1,1,2,3,5,5,3,2,1,1, superposition of the wide simple Gaussian 1,1,2,2,2,2,2,2,1,1 model and of the narrow Gaussian 1,3,3,1 model 1,1,2,4,5,5,4,2,1,1, superposition of the wide simple Gaussian 1,1,2,2,2,2,2,2,1,1 model and of the narrow Gaussian 2,3,3,2 model.

Structures with an odd number of samples:

1,1,3,4,3,1,1, superposition of the simple wide Gaussian 1,1, 2,2,2,1,1 model and of the narrow Gaussian 1,2,1 model 1,1,2,3,4,3,2,1,1, superposition of the simple wide Gaussian 1,1,2,2,2,2,2,1,1 model and of the narrow Gaussian 1,2,1 model 1,1,2,4,5,4,2,1,1 superposition of the simple wide Gaussian 1,1,2,2,2,2,2,1,1 model and of the narrow Gaussian 2,3,2 model.

Finally, in the limit, if one wished to minimize the number N of samples in total, it would be possible to take N=5 and to use the 1,2,4,2,1 model whose central spike at the level 4 represents the marked additional optical activity at the center of the laser beam; this model may be considered as the addition of a simple Gaussian 1,2,2,2,1 model and of a still simpler narrow Gaussian (0),2,(0) model localized at the center of the first.

These models are symmetric but it is possible to envisage an asymmetric model, for example 1,2,3,4,3,3,2,1,1 obtained by adding a 1,1,2,2,2,2,2,1,1 model and a 1,1,2,1,1 model that is not centered on the first (leftward shift by a period T).

The asymmetry may be useful for taking account of physical phenomena such as for example a response time of materials with an active layer in taking a different state under the effect of the illumination by the center of the laser beam. The asymmetry may be in one direction or another depending on the phenomenon that would appear to be useful to take into account. A leftward shift of two periods T rather than one period is also possible in order to culminate in the asymmetric 2,2,4,3,3,2,2,1,1 model. Or again a rightward shift of one period T to culminate in the 1,1,2,3,3,4,3,2,1 model or a rightward shift of two periods to culminate in the 1,1,2,2,3, 3,4,2,2 model.

Regardless of which model is chosen, it is used in a customary manner for PRML processing: a succession of K samples of an analog signal resulting from an actual reading of a sequence of recorded binary information is gathered, models of response to possible binary sequences of K samples are calculated, the resemblance between the succession received and each of the successions calculated is measured, and from this is deduced which binary sequence was probably the one recorded having regard to the best resemblance found.

The resemblance is preferably measured by a least squares procedure in which:

for a determined succession of samples, the sum is calculated of the squares of the differences between each sample of the succession received and the corresponding sample of the succession calculated, this is repeated for all the possible successions calculated, the various sums of squares calculated are compared, and the binary succession which gives the smallest sum of squares is selected from among all the possible binary successions.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of reading digital information registered in layers of an optical information storage medium that can be read in super-resolution on the basis of an optoelectronic system comprising a reading laser beam, the power density at the center of the reading laser beam is sufficient to produce a local modification of the optical properties of at least one of the layers over a smaller zone than the resolution of the optoelectronic system, the method comprising the steps of:

modeling of the response provided by varied binary sequences on the basis of the modeling of the partial response provided by an isolated information bit, and the searching for the maximum resemblance between a sequence of samples arising from the reading of the information and the responses of the varied sequences modeled, wherein the model corresponding to an isolated bit, on the basis of which the models for the varied binary sequences are established, includes the superposition of a first simple model representing a Gaussian representative of the spatial energy distribution of a reading laser beam and of a second simple model representative of a narrower Gaussian than the first and representative of an additional optical action limited to the central part of the laser beam.

2. A method of reading digital information registered in layers of an optical information storage medium that can be read in super-resolution on the basis of an optoelectronic system comprising the steps of:

reading a laser beam, the power density at the center of the laser beam is sufficient to produce a local modification of the optical properties of at least one of the layers over a smaller zone than the resolution of the optoelectronic system, the method comprising the modeling of the response provided by varied binary sequences on the basis of the modeling of the partial response provided by an isolated information bit, and the searching for the maximum resemblance between a sequence of samples arising from the reading of the information and the responses of the varied sequences modeled, this method being wherein the model corresponding to an isolated bit, on the basis of which the models for the varied binary sequences are established, consists of P samples of nonzero values where the nonzero values are taken among N possible values, the number P being at least 6 and the number N lying between 3 and 5.

3. The method of reading as claimed in claim 2, wherein the number P lies between 7 and 10.

4. The method of reading as claimed in claim 2, wherein the number N is equal to 4.

5. The method as claimed in claim 1, wherein the model corresponding to an isolated bit consists of the additive superposition of two simple models each having two possible nonzero levels, one having a number $P_2$ of samples that is around half the number $P_1$ of samples of the other, the samples of the second model being taken at the same instants as samples of the first model.

6. The method as claimed in claim 5, wherein the first model comprises $P_1=7$ or 8 nonzero samples with $N_1=2$ nominal values which are the values 1 and 2 and the second model comprises $P_2=3$ or 4 nonzero samples with $N_2=2$ nominal values taken among the values 1, 2 and 3.

7. The method as claimed in claim 1, wherein the model for an isolated bit is taken from among the following models:
1,1,3,4,4,3,1,1
1,1,2,3,5,5,3,2,1,1
1,1,2,4,5,5,4,2,1,1
1,1,3,4,3,1,1
1,1,2,3,4,3,2,1,1
1,1,2,4,5,4,2,1,1
1,2,3,4,3,3,2,1,1
1,1,2,3,3,4,3,2,1
2,2,4,3,3,2,2,1,1
1,1,2,2,3,3,4,2,2.

8. The method as claimed in claim 5, wherein the model for an isolated bit is asymmetric, consisting of the superposition of two symmetric simple models one of which is shifted forwards or backwards with respect to the center of temporal symmetry of the other.

9. The method as claimed in claim 1, wherein a succession of K samples of an analog signal resulting from an actual reading of a sequence of recorded binary information is gathered, models of response to possible binary sequences of K samples are calculated, the resemblance between the succession received and each of the successions calculated is measured, and from this is deduced which binary sequence was probably the one recorded having regard to the best resemblance found.

10. The method as claimed in claim 9, wherein the resemblance is measured by a least squares procedure in which:
for a determined succession of samples, the sum is calculated of the squares of the differences between each sample of the succession received and the corresponding sample of the succession calculated,
this is repeated for all the possible successions calculated,
the various sums of squares calculated are compared,
and the binary succession which gives the smallest sum of squares is selected from among all the possible binary successions.

11. The method as claimed in claim 2, wherein the model corresponding to an isolated bit consists of the additive superposition of two simple models each having two possible nonzero levels, one having a number $P_2$ of samples that is around half the number $P_1$ of samples of the other, the samples of the second model being taken at the same instants as samples of the first model.

12. The method as claimed in claim 11, wherein the first model comprises $P_1=7$ or 8 nonzero samples with $N_1=2$ nominal values which are the values 1 and 2 and the second model comprises $P_2=3$ or 4 nonzero samples with $N_2=2$ nominal values taken among the values 1, 2 and 3.

13. The method as claimed in claim 2, wherein a succession of K samples of an analog signal resulting from an actual reading of a sequence of recorded binary information is gathered, models of response to possible binary sequences of K samples are calculated, the resemblance between the succession received and each of the successions calculated is measured, and from this is deduced which binary sequence was probably the one recorded having regard to the best resemblance found.

14. The method as claimed in claim 13, wherein the resemblance is measured by a least squares procedure in which:
for a determined succession of samples, the sum is calculated of the squares of the differences between each sample of the succession received and the corresponding sample of the succession calculated,
this is repeated for all the possible successions calculated,
the various sums of squares calculated are compared,
and the binary succession which gives the smallest sum of squares is selected from among all the possible binary successions.

15. The method of reading as claimed in claim 3, wherein the number N is equal to 4.

16. The method as claimed in claim 2, wherein the model for an isolated bit is taken from among the following models:
1,1,3,4,4,3,1,1
1,1,2,3,5,5,3,2,1,1
1,1,2,4,5,5,4,2,1,1
1,1,3,4,3,1,1
1,1,2,3,4,3,2,1,1
1,1,2,4,5,4,2,1,1
1,2,3,4,3,3,2,1,1
1,1,2,3,3,4,3,2,1
2,2,4,3,3,2,2,1,1
1,1,2,2,3,3,4,2,2.

17. The method as claimed in claim 6, wherein the model for an isolated bit is asymmetric, consisting of the superposition of two symmetric simple models one of which is shifted forwards or backwards with respect to the center of temporal symmetry of the other.

* * * * *